US011455925B2

(12) United States Patent
Kim et al.

(10) Patent No.: US 11,455,925 B2
(45) Date of Patent: Sep. 27, 2022

(54) FOLDABLE ELECTRONIC DEVICE AND CONTENTS MULTI-STAGE DISPLAY METHOD THEREFOR

(71) Applicant: Samsung Electronics Co., Ltd., Suwon-si (KR)

(72) Inventors: Heejin Kim, Suwon-si (KR); Hangkyu Park, Suwon-si (KR); Dongjun Shin, Suwon-si (KR); Yongho Choi, Suwon-si (KR); Slaa Hwang, Suwon-si (KR); Younghak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/287,937

(22) PCT Filed: Oct. 15, 2019

(86) PCT No.: PCT/KR2019/013477
§ 371 (c)(1),
(2) Date: Apr. 22, 2021

(87) PCT Pub. No.: WO2020/085704
PCT Pub. Date: Apr. 30, 2020

(65) Prior Publication Data
US 2021/0398465 A1 Dec. 23, 2021

(30) Foreign Application Priority Data
Oct. 22, 2018 (KR) .................. 10-2018-0126069

(51) Int. Cl.
G09G 3/00 (2006.01)
G06F 3/01 (2006.01)
(Continued)

(52) U.S. Cl.
CPC ............. *G09G 3/035* (2020.08); *G06F 3/013* (2013.01); *G06F 3/0346* (2013.01); *G06V 40/19* (2022.01);
(Continued)

(58) Field of Classification Search
CPC .................. G09G 3/035; G09G 5/373; G09G 2320/0626; G09G 2340/0442;
(Continued)

(56) References Cited

U.S. PATENT DOCUMENTS 9,183,770 B2 11/2015 Lee et al.
9,747,868 B2 8/2017 Lee et al.
(Continued)

FOREIGN PATENT DOCUMENTS

JP 2008-116791 A 5/2008
KR 10-2014-0025933 A 3/2014
(Continued)

OTHER PUBLICATIONS

International Search Report dated Feb. 13, 2020 in connection with International Patent Application No. PCT/KR2019/013477, 2 pages.

*Primary Examiner* — Bryan Earles

(57) ABSTRACT

An electronic device is disclosed. A foldable electronic device according to one embodiment disclosed in the present document can comprise: a foldable display; a first sensor circuit for sensing the folding of the foldable electronic device; a second sensor circuit for sensing the holding, by a user, of the foldable electronic device; a processor functionally connected to the display, the first sensor circuit and the second sensor circuit; and a memory functionally connected to the processor. The memory can store instructions for enabling, when executed, the processor to display contents through the display, display the contents on a two-page basis through the display, when the folding of the foldable elec-
(Continued)

tronic device at a predetermined angle is sensed using the first sensor circuit, and display, in a first luminance, a first page of the two pages displayed through the display and display a second page in a second luminance, when the holding of the foldable electronic device for a predetermined time by one hand is sensed using the second sensor circuit. Additional various embodiments identified through the specification are possible.

14 Claims, 12 Drawing Sheets

(51) Int. Cl.
*G06K 9/00* (2022.01)
*G09G 5/373* (2006.01)
*G06F 3/0346* (2013.01)
*G06V 40/19* (2022.01)

(52) U.S. Cl.
CPC ..... *G09G 5/373* (2013.01); *G09G 2320/0626* (2013.01)

(58) Field of Classification Search
CPC ..... G09G 2340/045; G09G 2340/0464; G09G 2340/145; G09G 2354/00; G09G 2380/02; G06F 3/013; G06F 3/0346; G06F 3/147; G06F 1/1677; G06F 3/041; G06F 3/0483; G06V 40/19
See application file for complete search history.

(56) References Cited

U.S. PATENT DOCUMENTS

| | | | |
|---|---|---|---|
| 9,983,628 B2 | 5/2018 | Kim et al. | |
| 10,061,471 B2 | 8/2018 | Lee | |
| 10,073,668 B2 | 9/2018 | Chun et al. | |
| 10,497,339 B2 * | 12/2019 | Sato | G06F 1/1677 |
| 2010/0064244 A1 * | 3/2010 | Kilpatrick, II | H04M 1/0243 |
| | | | 345/1.3 |
| 2012/0192113 A1 * | 7/2012 | Higuchi | G06F 3/0488 |
| | | | 715/835 |
| 2013/0215041 A1 * | 8/2013 | Kim | G06F 3/1446 |
| | | | 345/173 |
| 2014/0055375 A1 | 2/2014 | Kim et al. | |
| 2016/0012797 A1 | 1/2016 | Lee et al. | |
| 2016/0188162 A1 | 6/2016 | Lee | |
| 2016/0378249 A1 | 12/2016 | Miura et al. | |
| 2017/0075640 A1 | 3/2017 | Chun et al. | |
| 2018/0181257 A1 | 6/2018 | Wang et al. | |
| 2018/0330694 A1 * | 11/2018 | Klein | G09G 5/003 |
| 2018/0356904 A1 * | 12/2018 | Disano | G06F 3/0488 |

FOREIGN PATENT DOCUMENTS

| | | |
|---|---|---|
| KR | 10-2014-0147253 A | 12/2014 |
| KR | 10-2016-0080851 A | 7/2016 |
| KR | 10-2017-0031525 A | 3/2017 |
| KR | 10-2018-0101964 A | 9/2018 |

* cited by examiner

<1010: BRIEFLY TURN TO RIGHT AND THEN RESTORE>  <1020: BRIEFLY TURN TO LEFT AND THEN RESTORE>

FOLDABLE ELECTRONIC DEVICE AND CONTENTS MULTI-STAGE DISPLAY METHOD THEREFOR

CROSS-REFERENCE TO RELATED APPLICATIONS

This application is a 371 of International Application No. PCT/KR2019/013477 filed on Oct. 15, 2019, which claims priority to Korean Patent Application No. 10-2018-0126069 filed on Oct. 22, 2018, the disclosures of which are herein incorporated by reference in their entirety.

BACKGROUND

1. Field

Embodiments of the present disclosure relate to a technology for displaying content in multiple columns.

2. Description of Related Art

Electronic devices provide various contents such as e-mail, web documents, or note functions. In addition, electronic devices provide user interfaces suitable for the provided contents. For example, when the E-book function is provided, the electronic device displays the E-book in units of one page or two pages, and provides a page-turning function based on a touch operation such as drag or swipe.

However, since it is difficult to perform a drag or swipe touch with a hand holding the electronic device, a user has to hold the electronic device with one hand and perform a touch for turning pages with the other hand. Accordingly, when both hands are not free, the user feels inconvenient in using the page-turning function.

Various embodiments disclosed in the present disclosure provide a foldable electronic device capable of switching pages of content by using one hand, and a multiple column display method for content.

SUMMARY

An aspect of the present disclosure provides a foldable electronic device including a foldable display, a first sensor circuit that is able to detect that the foldable electronic device is folded, a second sensor circuit that is able to detect holding of the foldable electronic device by a user, a processor functionally connected to the display, the first sensor circuit, and the second sensor circuit, and a memory functionally connected to the processor. The memory may store instructions that, when executed, cause the processor to display content through the display, display the content in units of two pages through the display if it is detected that the foldable electronic device is folded at a specified angle by using the first sensor circuit, and display, among the two pages displayed through the display, a first page with a first luminance and a second page with a second luminance, if it is detected that the foldable electronic device is held with one hand for a specified time by using the second sensor circuit.

Another aspect of the present disclosure provides a multiple column display method for content including displaying content in units of one page through a display, displaying the content in units of two pages if it is detected that the foldable electronic device is folded at a specified angle by using a first sensor circuit, and displaying, among the two pages displayed on the display, a first page with a first luminance and a second page with a second luminance, if it is detected that the foldable electronic device is held with one hand for a specified time by using a second sensor circuit.

According to the embodiments disclosed in the present disclosure, it is possible to easily switch pages of content by using one hand. Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

DETAILED DESCRIPTION

Figure 1:
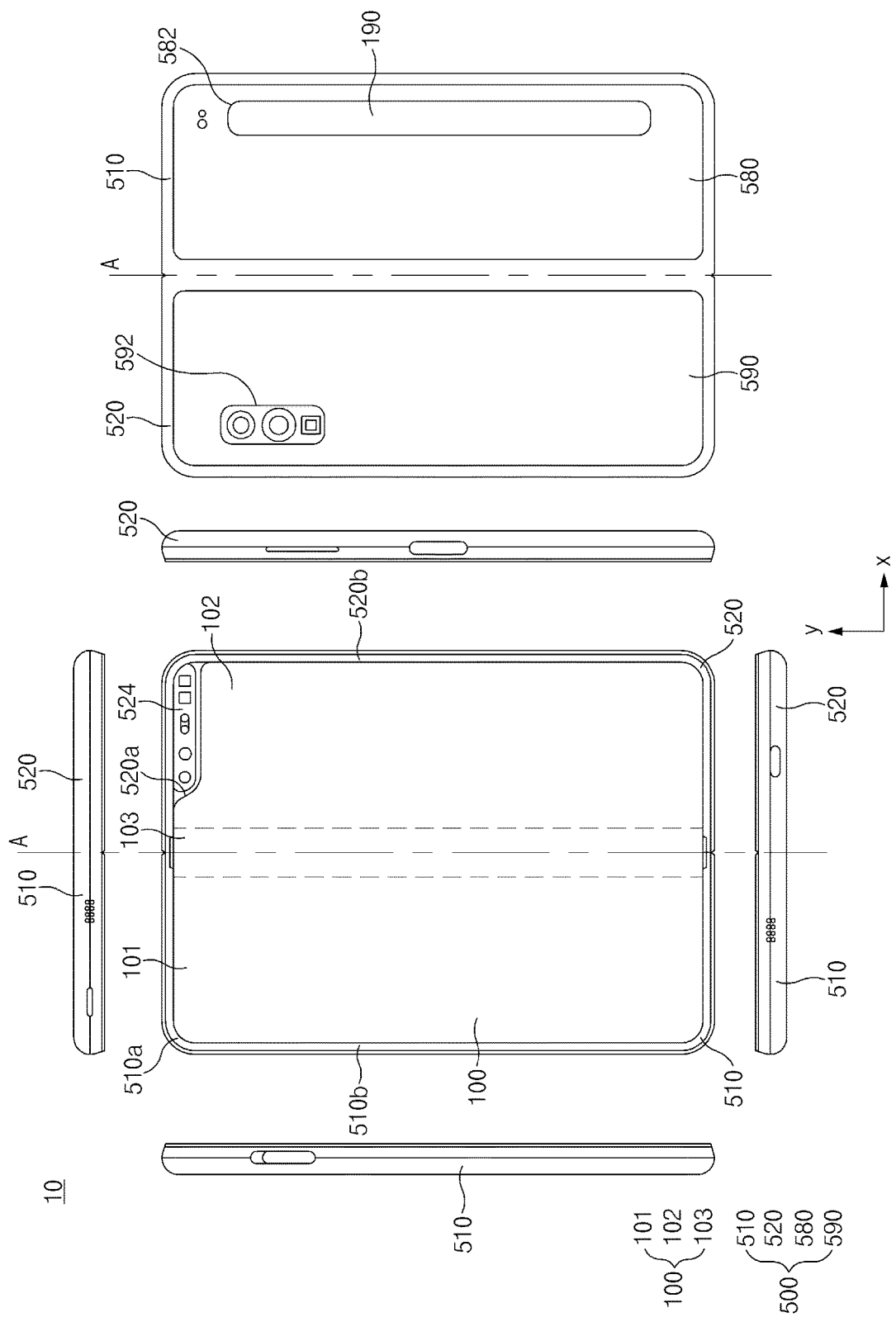
FIG. 1 illustrates a flat state of an electronic device according to an embodiment.
Figure 2:
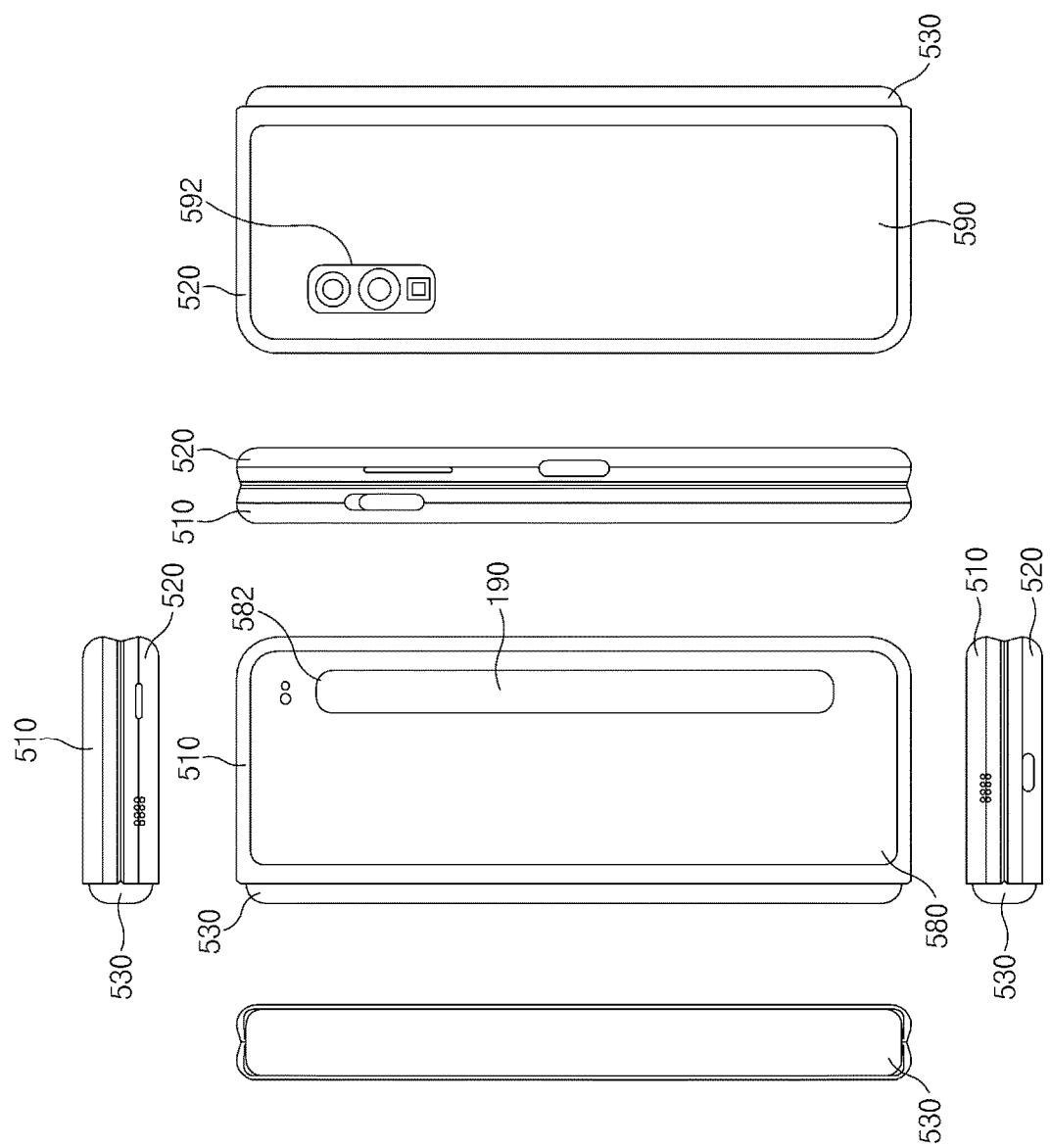
FIG. 2 illustrates a folded state of the electronic device according to an embodiment.

FIG. 1 illustrates a flat state of an electronic device according to an embodiment. FIG. 2 illustrates a folded state of the electronic device according to an embodiment. In an embodiment, an electronic device 10 may include a flat state or an unfolded state illustrated in FIG. 1, a folded state illustrated in FIG. 2, and an intermediate state between the flat state and the folded state. In the present disclosure, the term "folded state" refers to "fully folded state" unless specifically stated otherwise.

Referring to FIGS. 1 and 2, in an embodiment, an electronic device 10 may include a foldable housing 500, a hinge cover 530 covering a foldable portion of the foldable housing, and a flexible or foldable display 100 (hereinafter, abbreviated as a "display" 100) disposed in a space formed by the foldable housing 500. In the present disclosure, the surface on which the display 100 is disposed is defined as a first surface or a front surface of the electronic device 10. In addition, the opposite surface of the front surface is defined as a second surface or a back surface of the electronic device 10. In addition, a surface surrounding the space between the front surface and the back surface is defined as a third surface or a side surface of the electronic device 10.

In an embodiment, the foldable housing 500 may include a first housing structure 510, a second housing structure 520 including a sensor region 524, a first back cover 580, and a second back cover 590. The foldable housing 500 of the electronic device 10 is not limited to the shape and combination illustrated in FIGS. 1 and 2, and may be implemented by a combination and/or coupling of other shapes or components. For example, in another embodiment, the first housing structure 510 and the first back cover 580 may be integrally formed, and the second housing structure 520 and the second back cover 590 may be integrally formed.

In the illustrated embodiment, the first housing structure 510 and the second housing structure 520 may be arranged on both sides around a folding axis (A axis), and may have an overall symmetrical shape with respect to the folding axis A. As will be described below, the angle formed by or distance covered between the first housing structure 510 and the second housing structure 520 may vary depending on whether the electronic device 10 is in a flat state, in a folded state, or in an intermediate state. In the illustrated embodiment, the second housing structure 520 additionally includes the sensor region 524 in which various sensors are disposed, unlike the first housing structure 510, but may have a mutually symmetrical shape in other regions.

In an embodiment, at least a portion of the first housing structure 510 and the second housing structure 520 may be formed of a metal material or a non-metal material having a rigidity of a size selected to support the display 100.

In an embodiment, the sensor region 524 may be formed to have a predetermined region adjacent to one corner of the second housing structure 520. However, the displacement, shape, and size of the sensor region 524 are not limited to the illustrated example. For example, in another embodiment, the sensor region 524 may be provided at another corner of the second housing structure 520 or in any region between the upper corner and the lower corner. In an embodiment, components embedded in the electronic device 10 to perform various functions may be exposed on the front surface of the electronic device 10 through the sensor region 524 or through one or more openings provided in the sensor region 524. In various embodiments, the components may include various types of sensors. The sensors may include, for example, at least one of a front camera, a receiver, and a proximity sensor.

The first back cover 580 may be disposed on one side of the folding axis on the back surface of the electronic device, and may have, for example, a substantially rectangular periphery, which may be wrapped by the first housing structure 510. Similarly, the second back cover 590 may be disposed on the other side of the folding axis on the back surface of the electronic device, and the periphery thereof may be wrapped by the second housing structure 520.

In the illustrated embodiment, the first back cover 580 and the second back cover 590 may have a substantially symmetrical shape around the folding axis (A axis). However, the first back cover 580 and the second back cover 590 do not necessarily have mutually symmetrical shapes, and in another embodiment, the electronic device 10 may include the first back cover 580 and the second back cover 590 having various shapes. In yet another embodiment, the first back cover 580 may be integrally formed with the first housing structure 510, and the second back cover 590 may be integrally formed with the second housing structure 520.

In an embodiment, the first back cover 580, the second back cover 590, and the first housing structure 510, and the second housing structure 520 may form a space in which various components (e.g., a printed circuit board, or a battery) of the electronic device 10 may be arranged. In an embodiment, one or more components may be arranged on the back surface of the electronic device 10 or may be visually exposed. For example, at least a portion of the sub-display 190 may be visually exposed through a first back region 582 of the first back cover 580. In another embodiment, one or more components or sensors may be visually exposed through a second back region 592 of the second back cover 590. In various embodiments, the sensor may include a proximity sensor and/or a rear camera.

Referring to FIG. 2, the hinge cover 530 may be disposed between the first housing structure 510 and the second housing structure 520 and may be configured to cover an internal part (e.g., a hinge structure). In an embodiment, the hinge cover 530 may be covered by a portion of the first housing structure 510 and the second housing structure 520 or exposed to the outside, depending on the state (the flat state or the folded state) of the electronic device 10.

For example, as illustrated in FIG. 1, if the electronic device 10 is in the flat state, the hinge cover 530 may not be exposed to by being covered by the first housing structure 510 and the second housing structure 520. For example, as illustrated in FIG. 2, if the electronic device 10 is in the folded state (e.g., the fully folded state), the hinge cover 530 may be exposed to the outside between the first housing structure 510 and the second housing structure 520. For example, if the first housing structure 510 and the second housing structure 520 are in the intermediate state in which they are folded with a certain angle, the hinge cover 530 may be partially exposed to the outside between the first housing structure 510 and the second housing structure 520. However, in this case, the exposed region may be less than the fully folded state. In an embodiment, the hinge cover 530 may include a curved surface.

The display 100 may be disposed in a space formed by the foldable housing 500. For example, the display 100 may be seated on a recess formed by the foldable housing 500 to constitute most of the front surface of the electronic device 10.

Therefore, the front surface of the electronic device 10 may include the display 100, and a partial region of the first housing structure 510 and a partial region of the second housing structure 520 which are adjacent to the display 100. Further, the back surface of the electronic device 10 may include the first back cover 580, a partial region of the first housing structure 510 adjacent to the first back cover 580, the second back cover 590, and a partial region of the second housing structure 520 adjacent to the second back cover 590.

The display 100 may refer to a display of which at least a partial region may be transformed into a flat or curved surface. In an embodiment, the display 100 may include a folding region 103, a first region 101 disposed on one side (left side of the folding region 103 illustrated in FIG. 1) based on the folding region 103, and a second region 102 disposed on the other side (right side of the folding region 103 illustrated in FIG. 1).

The region division of the display 100 illustrated in FIG. 1 is exemplary, and the display 100 may be divided into a plurality (e.g., 4 or more or 2) of regions depending on the structure or function. For example, in the embodiment illustrated in FIG. 1, the region of the display 100 may be divided by the folding region 103 extending parallel to the y-axis or the folding axis (A-axis), but in another embodiment, the region of the display 100 may be divided based on another folding region (e.g., a folding region parallel to the x-axis) or another folding axis (e.g., a folding axis parallel to the x-axis).

The first region 101 and the second region 102 may have an overall symmetric shape around the folding region 103. However, unlike the first region 101, the second region 102 may include a cut notch depending on whether the sensor region 524 is present, but in other regions, may have a shape symmetrical with the first region 101. In other words, the first region 101 and the second region 102 may include portions having a shape symmetrical with each other and portions having a shape asymmetrical with each other.

Hereinafter, operations of the first housing structure 510 and the second housing structure 520 and regions of the display 100 will be described for states (e.g., the flat state and the folded state) of the electronic device 10.

In an embodiment, when the electronic device 10 is in the flat state (e.g., FIG. 1), the first housing structure 510 and the second housing structure 520 may be arranged to form an angle of 180 degrees and face the same direction. The surface of the first region 101 and the surface of the second region 102 of the display 100 form 180 degrees to each other, and may face the same direction (e.g., the front direction of the electronic device). The folding region 103 may form the same plane as the first region 101 and the second region 102.

In an embodiment, if the electronic device 10 is in the folded state (e.g., FIG. 2), the first housing structure 510 and the second housing structure 520 may be arranged to face each other. The surface of the first region 101 and the surface of the second region 102 of the display 100 form a narrow angle (e.g., from 0 degrees to 10 degrees) and may face each other. At least a portion of the folding region 103 may be formed of a curved surface having a predetermined curvature.

In an embodiment, if the electronic device 10 is in the intermediate state (e.g., FIG. 2), the first housing structure 510 and the second housing structure 520 may be arranged at a certain angle to each other. The surface of the first region 101 and a surface of the second region 102 of the display 100 may form an angle that is larger than that in the folded state and smaller than that in the flat state. At least a portion of the folding region 103 may be formed of a curved surface having a predetermined curvature, and in this case, the curvature may be smaller than in the folded state.

Figure 3:
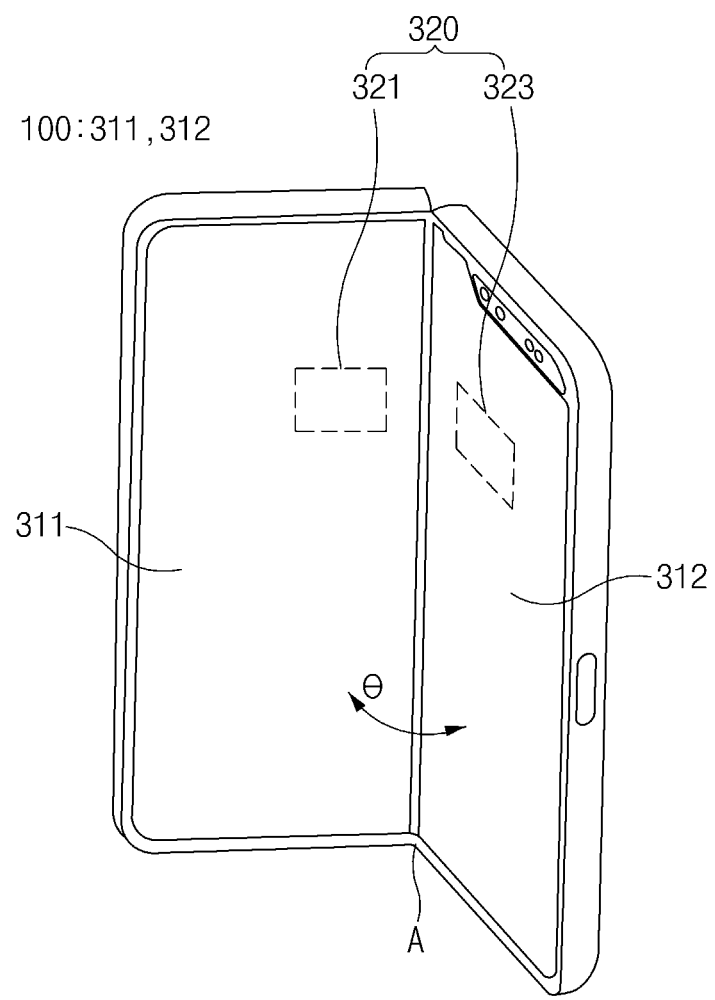
FIG. 3 illustrates a state in which an electronic device is folded at a specified angle according to an embodiment.

FIG. 3 illustrates a state in which an electronic device is folded at a specified angle according to an embodiment.

Referring to FIG. 3, the electronic device 10 (e.g., the electronic device 10 of FIG. 1) may be fixed in an intermediate state between a folded state and a flat state. For example, the hinge structure included in the hinge cover 530 may fix the first housing structure 510 and the second housing structure in the intermediate state between the folded state and the flat state of the electronic device 10. For another example, the hinge structure may fix the first housing structure 510 and the second housing structure 520 such that the first housing structure 510 and the second housing structure 520 form a specified angle (e.g., θ=150 degrees) with respect to each other. A method of fixing the hinge structure between the first housing structure 510 and the second housing structure 520 may be derived from the related art by a person skilled in the art, and thus a detailed description thereof will be omitted. In the following, a state in which the first housing structure 510 and the second housing structure 520 are fixed to form a specified angle with respect to each other is referred to as a state in which the electronic device 10 is folded at a specified angle.

According to an embodiment, the electronic device 10 may include at least one sensor circuit 320, and may detect the flat state, the folded state, and a state of being folded at a specified angle, of the electronic device 10, by using at least one sensor circuit 320. For example, a Hall sensor 321 may be disposed in the left region 311 of the electronic device 10 based on the folding axis A, and a magnet 322 may be disposed on the right region 312 of the electronic device 10 to face the Hall sensor 321 in the folded state of the electronic device 10. The Hall sensor 321 may not detect the magnetic field of the magnet 322 as the Hall sensor 321 does not face the magnet 322 in the flat state of the electronic device 10, and may detect the magnet field of the magnet 322 as the Hall sensor 321 faces at least a part of the magnet 322 when the electronic device 10 is folded. The Hall sensor 321 may detect a larger magnetic field strength of the magnet 322 as the electronic device 10 is folded more.

The electronic device 10 may determine that the electronic device 10 is in the folded state if the magnetic field strength detected by using the Hall sensor 321 is equal to or greater than a first specified strength. The electronic device 10 may determine that the electronic device 10 is in the flat state if the magnetic field strength detected by using the Hall sensor 321 is less than a second specified strength (e.g., zero). The electronic device 10 may determine that the electronic device 10 is in a state of being folded at a specified angle if the magnetic field strength detected by the Hall sensor 321 falls within a specified range. The specified range may be determined through an experiment for measuring the magnetic field strength in a state in which the electronic device 10 is folded at a specified angle.

According to an embodiment, the electronic device 10 may control the display 100 to correspond to the flat state, the folded state, and the state of being folded at a specified angle, of the electronic device 10. For example, if the electronic device 10 is folded while the display 100 is being activated, the electronic device 10 may deactivate the display 100. For another example, if the electronic device 10 that has been folded becomes flat, the electronic device 10 may activate the display 100. For yet another example, in the state in which the electronic device 10 is folded at a specified angle, the electronic device 10 may display content displayed on the display 100 differently from the flat state of the electronic device 10. The electronic device 10 may recognize that the magnetic field strength detected by the Hall sensor 321 falls within a specified range while displaying content in units of one page in the flat state of the electronic device 10. In this case, the electronic device 10 may determine that the electronic device 10 is in a state of being folded at a specified angle, and may display the content in units of two pages.

According to an embodiment, the electronic device 10 may support a one-hand operation mode, in the state in which the electronic device 10 is folded at a specified angle. For example, if it is recognized (or, checked) that the electronic device 10 is held with one hand of the user for a first specified time in the state of being folded at a specified angle, the electronic device 10 may switch to the one-hand operation mode, and in the one-hand operation mode, may switch the page of the content displayed on the display 100 based on at least one of the movement of the electronic device 10 or the graze direction of the user.

Figure 4:
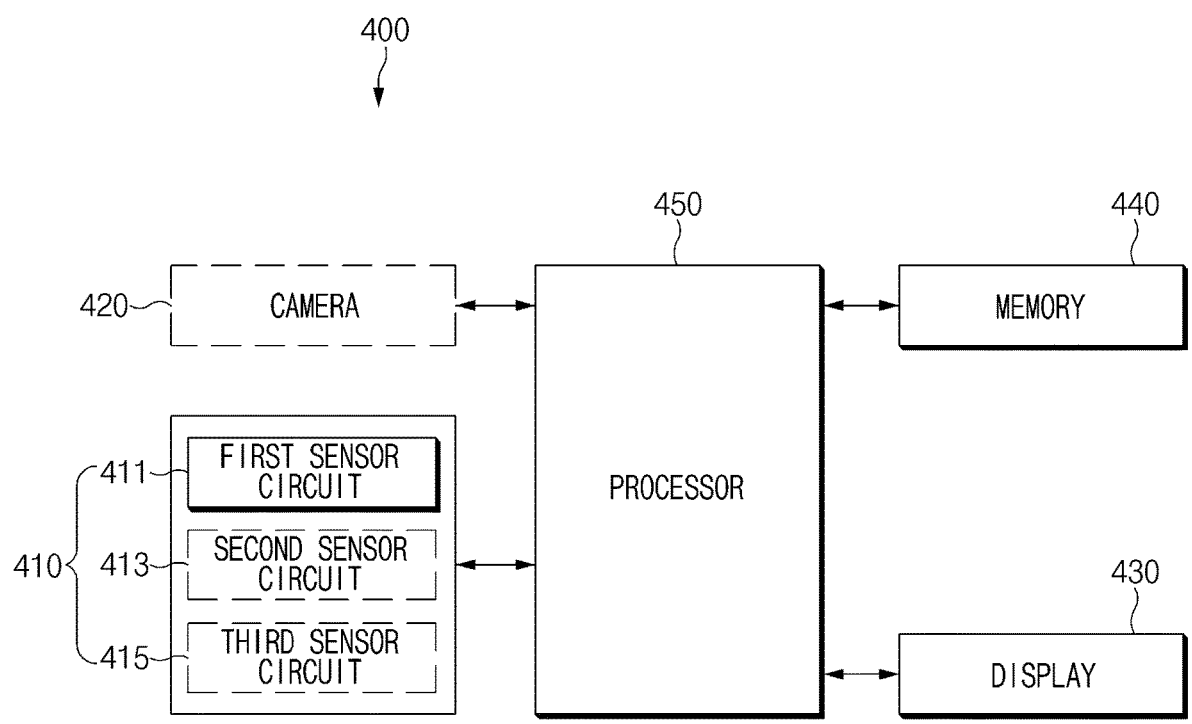
FIG. 4 illustrates a configuration diagram of an electronic device according to an embodiment.

FIG. 4 illustrates a configuration diagram of an electronic device according to an embodiment.

Referring to FIG. 4, an electronic device 400 (e.g., the foldable electronic device 10 of FIG. 1) may include a sensor circuit 410 (e.g., the Hall sensor 321 of FIG. 3), a display 430 (e.g., the display 100 of FIG. 1), a memory 440, and a processor 450. In an embodiment, the electronic device 400 may omit some components or further include additional components. For example, the electronic device 400 may further include a camera 420. In an embodiment, some of the components of the electronic device 400 are combined to form a single entity, and the same functions of the corresponding components before the combination may be performed.

According to an embodiment, the sensor circuit 410 may include a first sensor circuit 411 capable of detecting the folding of the electronic device 400, a second sensor circuit 413 capable of detecting the holding of the electronic device 400 by the user, and a third sensor circuit 415 capable of detecting the movement of the electronic device 400. The first sensor circuit 411 may include a Hall sensor (e.g., the Hall sensor 321 of FIG. 3) capable of detecting magnetic field strength. The Hall sensor is disposed to be faced with the magnet 322 (e.g., the magnet 322 of FIG. 3) in the folded state of the electronic device 400, and thus may detect the magnetic field strength of the magnet 322 differently depending on the degree to which the electronic device 400 is folded. The second sensor circuit 413 may include at least one of a touch sensor coupled to the display 430 or a pressure sensor or a proximity sensor provided on a first surface of the electronic device 400. A plurality of pressure sensors is disposed on the first surface (e.g., a back surface) of the electronic device 400, for example, to detect a pressure by the holding of the user. The proximity sensor is disposed on the first surface (e.g., the back surface) of the electronic device 400, for example, to detect proximity by the holding of the user. The third sensor circuit 415 may detect movement of the electronic device 400. The third sensor circuit 415 may include at least one of, for example, a gyro sensor or an acceleration sensor. The third sensor circuit 415 may further include a geomagnetic sensor.

The display 430 may display, for example, various contents (e.g., text, images, videos, icons, and/or symbols). The display 430 may include, for example, a liquid crystal display (LCD), a light emitting diode (LED) display, an organic light emitting diode (OLED) display, or an electronic paper display. The display 430 may include a flexible display or a foldable display. The display 430 may include a touch screen display combined with a touch sensor. In the present disclosure, an example in which the display 430 is a touch screen display will be described. However, the present disclosure is not limited thereto.

The memory 440 may store, for example, a command or data related to at least one other component of the electronic device 400. The memory 440 may be a volatile memory (e.g., RAM or the like), a nonvolatile memory (e.g., ROM, flash memory, or the like), or a combination thereof. The memory 440 may store instructions that, when executed, cause the processor to display content through the display 430, display the content in units of two pages through the display 430 if it is detected that the electronic device 400 is folded at a specified angle by using the first sensor circuit 411, and display, among the two pages displayed through the display 430, a first page with a first luminance and a second page with a second luminance, if it is recognized that the electronic device 400 is held with one hand for a first specified time by using the second sensor circuit 413.

According to an embodiment, the processor 450 may display content through the display 430 in response to the input of the user. For example, if a designated application (app) is executed, the processor 450 may display content through the designated app. The designated app may include, for example, an E-book app, a web browser, a note app, and a gallery app. The processor 450 may control at least one other component of the electronic device 400 and/or may execute an operation or data processing related to communication by using the instructions stored in the memory 440.

According to an embodiment, if the electronic device 400 is in the flat state, the processor 450 may display the content in units of one page (normal mode). The processor 450 may arrange the content in an up-down direction in the normal mode and may switch the page of the content based on the vertical scroll. The processor 450 may detect that the electronic device 400 is folded at a specified angle by using the first sensor circuit 411 while the content is displayed in units of one page. If the processor 450 detects that the electronic device 400 is folded at a specified angle, the processor 450 may display the content in units of two pages (multiple-column mode). The processor 450 may arrange pages of content in a right-left direction in the multiple-column mode, and may switch pages of the content based on a swipe (or drag) in the right-left direction.

According to an embodiment, if it is detected that the electronic device 400 is held by the user in the multiple-column mode for the first specified time by using the second sensor circuit 413, the processor 450 may switch the multiple-column mode to the one-hand operation mode. For example, the processor 450 may recognize contact information including at least one of the contact position of the user, the contact area, or the shape of the contact portion with respect to the first surface (e.g., the back surface) of the electronic device 400, by using the second sensor circuit 413, and may recognize whether the electronic device 400 is held by the user, based on the recognized contact information. For another example, if it is detected that a touch of a specified area or more for a specified position of the electronic device 400 by using the second sensor circuit 413, the processor 450 may determine that the electronic device 400 is held by the user.

According to an embodiment, the processor 450 may switch pages in units of two pages based on the movement (e.g., rotation angle) of the electronic device 400 in the one-hand operation mode. For example, the processor 450 may recognize the rotation angle of the electronic device 400 based on the folding axis (e.g., the folding axis A of FIG. 1) by using the third sensor circuit 415. If it is recognized, based on the recognized rotation angle, that the right-left direction of the electronic device 400 is rotated to the left of the electronic device 400 within a second specified time and then restored, the processor 450 may display next two pages of the two pages displayed on the display 430. If it is recognized, based on the recognized rotation angle, that the electronic device 400 is rotated to the right within the second specified time and then restored, the processor 450 may display previous two pages of the two pages displayed on the display 430.

According to an embodiment, the processor 450 may display, among the two pages displayed on the display 430 in the one-hand operation mode, a first page (e.g., preceding page) with a first luminance, and a second page (e.g., following page) with a second luminance. The first luminance may be, for example, a luminance at which a user is able to recognize the content. The first luminance may be set to correspond to (e.g., match) information on luminance (brightness) of the display 430 set in the electronic device 400, for another example. The second luminance may be lower than the first luminance. The second luminance may include a luminance at which the user is not able to recognize the content. In this regard, if switching to the one-hand operation mode is performed, the processor 450 may recognize whether the power saving function for the one-hand operation mode is set, and if the power saving function for the one-hand operation mode is set, may display the first page with the first luminance and the second page with the second luminance.

In an embodiment, the processor 450 may recognize the gaze direction of the user based on the image acquired by using the camera 420 in the one-hand operation mode, and may display one of the two pages with the first luminance and the other with the second luminance based on the recognized gaze direction. For example, if switching to the one-hand operation mode is performed, the processor 450 may acquire an image by using the camera 420 (e.g., the camera provided in the sensor region 524 of FIG. 1) and may recognize the gaze direction of the user based on the image. The processor 450 may display a page facing the gaze direction among the two pages with the first luminance and may display the other page with the second luminance. Then, the processor 450 may change the page displayed with the first luminance and the page displayed with the second luminance based on the change in the gaze direction.

In an embodiment, the processor 450 may display one of the two pages with the first luminance and the other with the second luminance based on the rotation angle of the electronic device 400 detected by using the third sensor circuit 415 in the one-hand operation mode. For example, if it is detected that the electronic device 400 remains for a third specified time in a state in which it rotates to the left with respect to the folding axis, based on the recognized rotation angle of the electronic device 400, the processor 450 may display a left page (e.g., left page based on the folding axis) of the two pages with the first luminance and a right page (e.g., right page based on the folding axis) with the second luminance. For example, if it is detected that the electronic device 400 remains for the third specified time in a state in which it rotates to the right with respect to the folding axis, based on the rotation angle of the electronic device 400 detected by using the third sensor circuit 415, the processor 450 may display the right page with the first luminance and the left page with the second luminance.

In an embodiment, the processor 450 may determine a page to be displayed with the first luminance and a page to be displayed with the second luminance among the two pages, based on the gaze direction recognized by using the camera 420 and the rotation angle of the electronic device 400 detected by using the third sensor circuit 415. For example, when it is recognized, based on the rotation angle of the electronic device 400, that the electronic device 400 remains for the third specified time in the state in which it rotates to the left with respect to the folding axis, if it is recognized that the gaze direction faces the left page, the processor 450 may display the left page with the first luminance and the right page with the second luminance. For another example, when it is recognized, based on the rotation angle of the electronic device 400, that the electronic device 400 remains for the third specified time in the state in which it rotates to the right with respect to the folding axis, if it is recognized that the gaze direction faces the right page, the processor 450 may display the right page with the first luminance and the left page with the second luminance.

According to an embodiment, if it is recognized that the holding of the electronic device 400 is released by using the second sensor circuit 413 in the one-hand operation mode, the processor 450 may switch to the multiple-column mode. For example, if one hand of the user holding the electronic device 400 is separated from the electronic device 400 in the one-hand operation mode, the processor 450 may switch from the one-hand operation mode to the multiple-column mode. According to various embodiments, if the holding of the electronic device 400 is released within a fourth specified time (e.g., approximately 3 seconds) and then the electronic device 400 is held again in the one-hand operation mode, the processor 450 may not detect release of the holding. Additionally or alternatively, if only a part of one hand of the user holding the electronic device 400 is separated from the electronic device 400 in the one-hand operation mode, the processor 450 may not detect release of the holding. Thus, according to the embodiment described above, if the user temporarily removes or moves one hand (e.g., thumb) holding the electronic device 400 in order to recognize a portion of the content covered by the hand, the processor 450 may not detect release of the holding.

According to an embodiment, if it is detected that the electronic device 400 switches from the state of being folded at a specified angle to the flat state of the electronic device 400 by using the first sensor circuit 411, the processor 450 may display the content, which has been displayed in units of two pages, in units of one page. In addition, if it is detected that the electronic device 400 switches from the state of being folded at a specific angle to the folded state of the electronic device 400 in the multiple-column mode by using the first sensor circuit 411, the processor 450 may deactivate the display 430.

According to various embodiments, the processor 450 may display both pages displayed on the display 430 with the first luminance when switching to the one-hand operation mode, and then may display the first page with the first luminance and the second page with the second luminance based on additional input. The additional input may include, for example, at least one of an angle change detected by using the third sensor circuit 415 or the gaze direction of the user recognized by using the camera 420.

According to various embodiments, the processor 450 may perform a function corresponding to a specified touch input differently from other modes in the multiple-column mode. For example, responding to a first touch input (e.g., a tap touch) in the multiple-column mode, the processor 450 may enlarge just one (e.g., page touched by the first touch input) of two pages displayed on the display 430 and display the enlarged one. Alternatively, responding to the first touch input (e.g., a tap touch) in the normal mode, the processor 450 may enlarge a page displayed on the display 430 and display the enlarged one. For another example, the processor 450 may perform a page-turning function in units of two pages in response to a second touch input (e.g., a swipe touch) in the multiple-column mode, and may perform a scroll function in response to the second touch input in the normal mode.

According to various embodiments, the processor 450 recognizes whether the folding axis A of the electronic device 400 is oriented horizontally or vertically in the multiple-column mode and the one-hand operation mode, and may arrange the content in an up-down direction or right-left direction. For example, if it is recognized that the folding axis A is oriented vertically (e.g., a vertical line direction) by using the third sensor circuit 415, the processor 450 may arrange the two pages of the content in the up-down direction of the electronic device 400. For example, if it is recognized that the folding axis A is oriented horizontally (e.g., a horizontal line direction) by using the third sensor circuit 415, the processor 450 may arrange the two pages of the content in the right-left direction of the electronic device 400.

According to the above-described embodiment, the processor 450 lowers the luminance of a page not being read by the user (a page displayed with a second luminance) in a multiple-column mode in which content is displayed in units of two pages, thereby making it possible to reduce power consumption of the display 430. Furthermore, the processor 450 may improve the convenience of page switching by using one hand of the user.

According to an embodiment, a foldable electronic device (e.g., the electronic device 400 of FIG. 4) may include a foldable display (the display 430 of FIG. 4), a first sensor circuit (e.g., the first sensor circuit 411 of FIG. 4) that is able to detect that the foldable electronic device is folded, a second sensor circuit (e.g., the second sensor circuit 413 of FIG. 4) that is able to detect holding of the foldable electronic device by a user, a processor (e.g., the processor 450 of FIG. 4) functionally connected to the display, the first sensor circuit, and the second sensor circuit, and a memory (the memory 440 of FIG. 4) functionally connected to the processor. The memory may store instructions that, when executed, cause the processor to display content through the display, display the content in units of two pages through the display if it is detected that the foldable electronic device is folded at a specified angle by using the first sensor circuit, and display, among the two pages displayed through the display, a first page with a first luminance and a second page with a second luminance, if it is detected that the foldable electronic device is held with one hand for a specified time by using the second sensor circuit.

The second luminance may be lower than the first luminance.

The foldable electronic device may further include third sensor circuit (e.g., the third sensor circuit 415 of FIG. 4) that is able to detect a rotation angle of the foldable electronic device, and the instructions may cause the processor to display the first page with the second luminance and the second page with the first luminance based on the rotation angle of the foldable electronic device by using the third sensor circuit.

The instructions may cause the processor to display previous two pages or next two pages of the two pages based on change in the rotation angle.

The instructions may cause the processor to recognize whether a folding axis of the foldable electronic device is oriented horizontally or vertically by using the third sensor circuit, arrange the two pages in a right-left direction of the foldable electronic device if the folding axis is oriented vertically, and arrange the two pages in the up-down direction of the foldable electronic device if the folding axis is oriented horizontally.

The foldable electronic device may further include a camera (e.g., the camera 420 of FIG. 4), and the instructions may cause the processor to recognize a gaze direction of a user by using the camera, and determine the first page and the second page among the two pages based on the recognized gaze direction.

The foldable display may include a touchscreen display, and the instructions may cause the processor to determine a function corresponding to a touch detected through the touchscreen display differently before detecting that the foldable electronic device is folded at the specified angle and after detecting that the foldable electronic device is folded at the specified angle.

The instructions may cause the processor to enlarge at least a portion of the first page without enlarging the second page to display the enlarged portion, in response to a first touch operation on the first page, if it is detected that the foldable electronic device is folded at the specified angle.

The second sensor circuit may include at least one of a touch sensor coupled to the display or a proximity sensor or a pressure sensor provided on a first surface of the foldable electronic device.

The instructions may cause the processor to display the first page and the second page with the first luminance if it is recognized that the holding of the foldable electronic device is released by using the second sensor circuit.

The instructions may cause the processor to display the content in units of one page through the display if it is detected that the foldable electronic device is unfolded to exceed the specified angle by using the first sensor circuit.

Hereinafter, an example of displaying content in units of two pages according to an embodiment will be described with reference to FIGS. 5 to 8.

Figure 5:
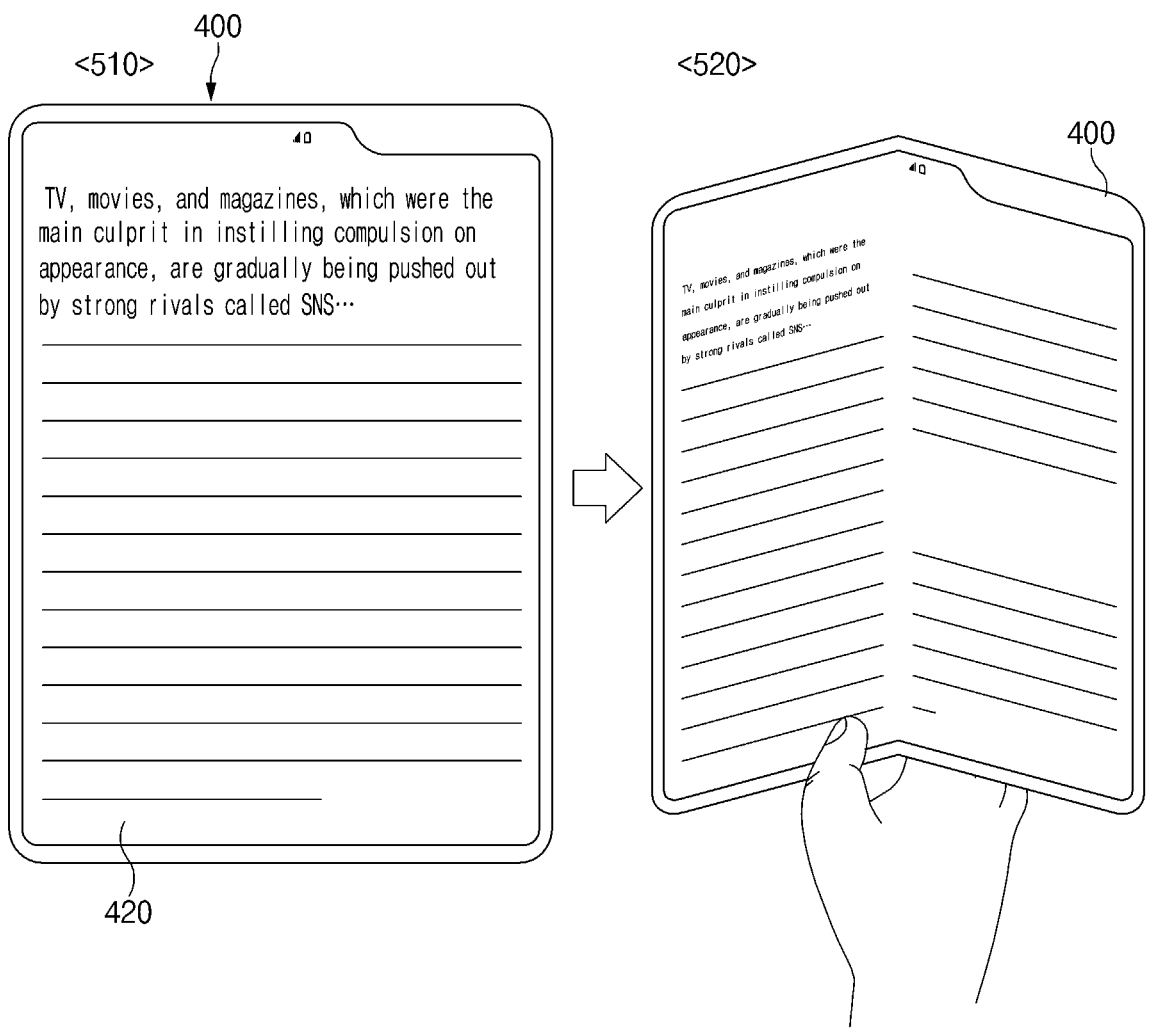
FIG. 5 illustrates a user interface (UI) screen for displaying an E-book in units of two pages according to an embodiment.

FIG. 5 illustrates a user interface (UI) screen for displaying an E-book in units of two pages according to an embodiment.

Referring to FIG. 5, as in the screen 510, in the flat state of the electronic device 400 (e.g., the electronic device 400 of FIG. 4), the electronic device 400 may display an E-book in units of one page (normal mode).

As in a screen 520, if it is detected that the electronic device 400 is folded at a specified angle while displaying the E-book in units of one page, the electronic device 400 may display the E-book in units of two pages based on the folding axis A (the multiple-column mode or one-hand operation mode). The electronic device 400 may reduce the size of text included in the E-book in the multiple-column mode or the one-hand operation mode compared to the normal mode. Alternatively, the electronic device 400 may set the size of the text included in the E-book in the multi-level mode or the one-hand operation mode to be the same as the normal mode.

Figure 6:
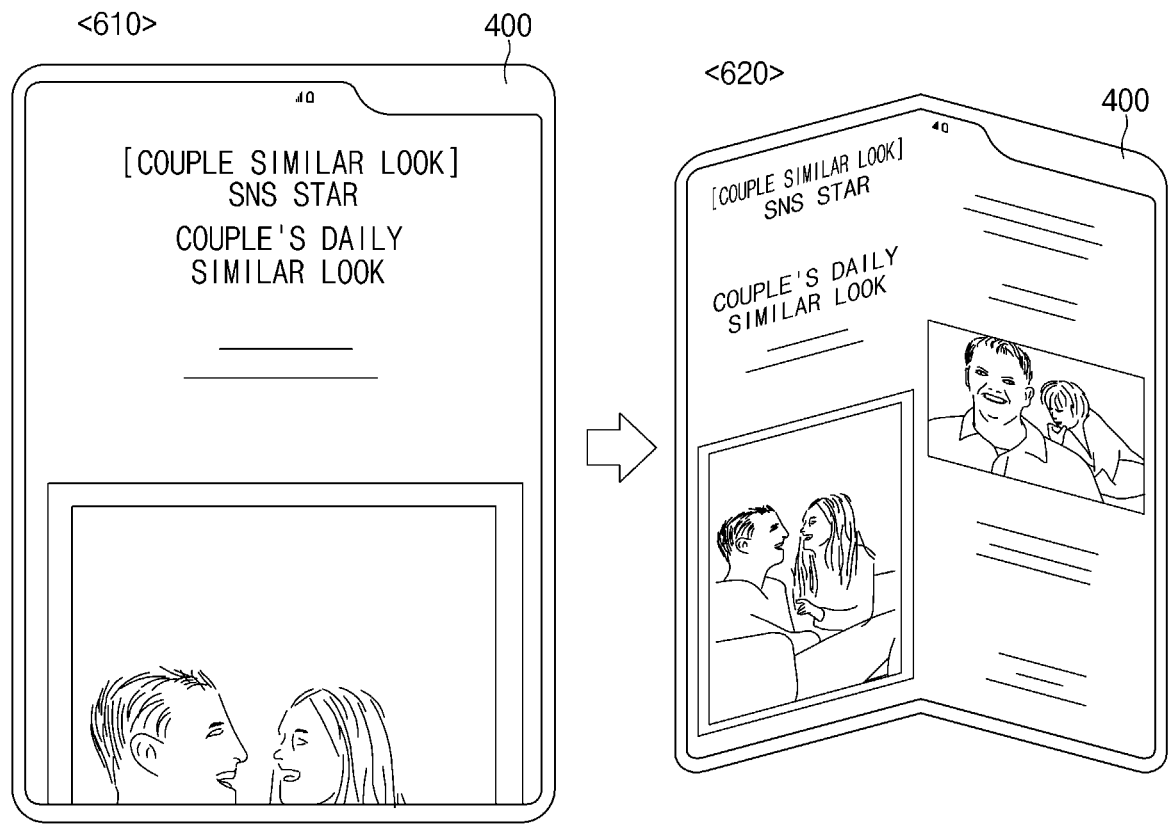
FIG. 6 illustrates a UI screen for displaying a web document in units of two pages according to an embodiment.

FIG. 6 illustrates a UI screen for displaying a web document in units of two pages according to an embodiment.

Referring to FIG. 6, in a screen 610, the electronic device 400 (e.g., the electronic device 400 of FIG. 4) may arrange a web document in the up-down direction in the flat state of the electronic device 400, and may display the web document in units of one page (normal mode). The electronic device 400 may move a page of the web document in the up-down direction based on a touch input of scrolling the display 430 in the up-down direction in the normal mode.

In a screen 620, if it is detected that the electronic device 400 is folded at a specified angle while displaying the web document in units of one page, the electronic device 400 may arrange the web document in the right-left direction and may display the web document in units of two pages based on the folding axis A (the multiple-column mode or one-hand operation mode). The electronic device 400 may reduce the size of text included in the E-book in the multiple-column mode or the one-hand operation mode compared to, for example, the normal mode. The electronic device 400 may move a page of the web document in the right-left direction based on a touch input of swiping the display 430 in the right-left direction in the multiple-column mode. The electronic device 400 may move a page of the web document based on an angle change of the electronic device 400 in the one-hand operation mode.

Figure 7:
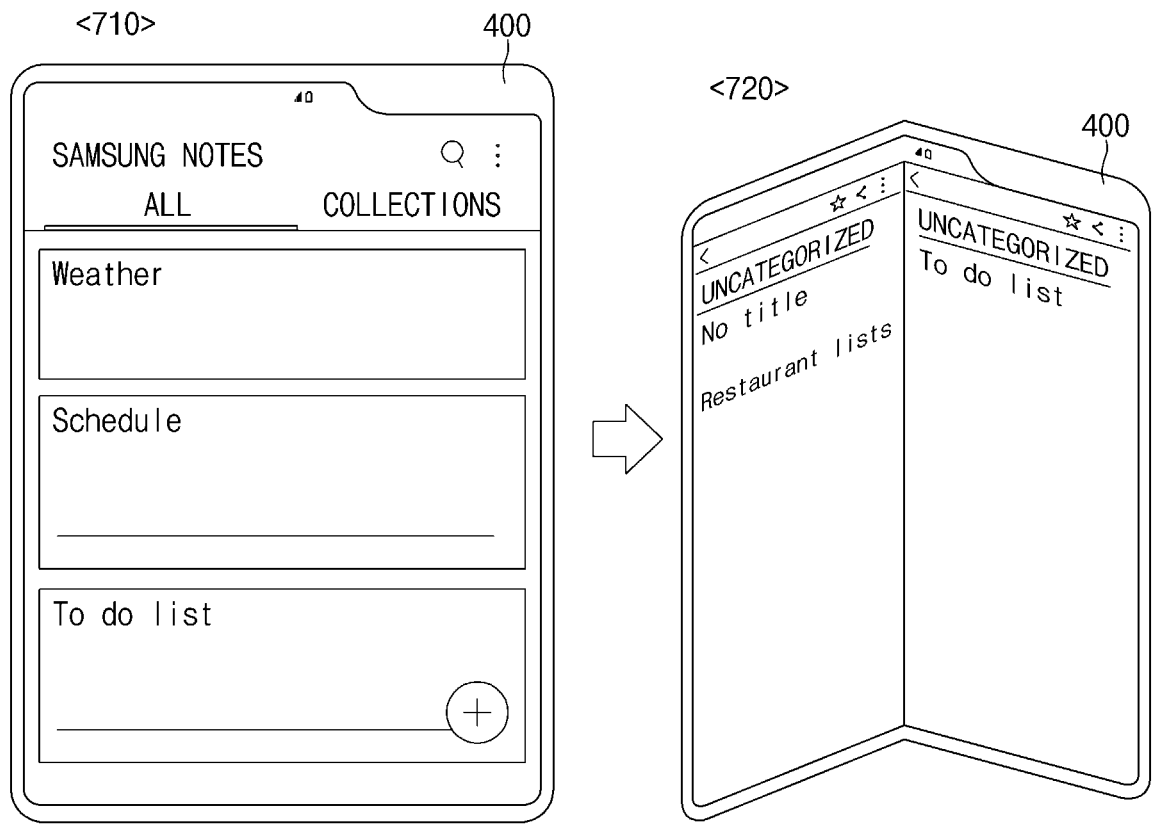
FIG. 7 illustrates a UI screen for displaying note content in units of two pages according to an embodiment.

FIG. 7 illustrates a UI screen for displaying note content in units of two pages according to an embodiment.

Referring to FIG. 7, in a screen 710, in the flat state of the electronic device 400 (e.g., the electronic device 400 of FIG. 4), the electronic device 400 may display a note document in units of one page (normal mode).

In a screen 720, if it is detected that the electronic device 400 is folded at a specified angle while displaying the note document in units of one page, the electronic device 400 may edit the note document to be displayed in the multiple columns (displayed in units of two pages), and may display the edited note document in units of two pages. For example, the electronic device 400 may display a weather record, a schedule record, and a to-do list record in units of one page unit in the normal mode, and may display the weather record and the schedule record on the left page, and the to-do list record on the right page in the multiple-column mode.

Figure 8:
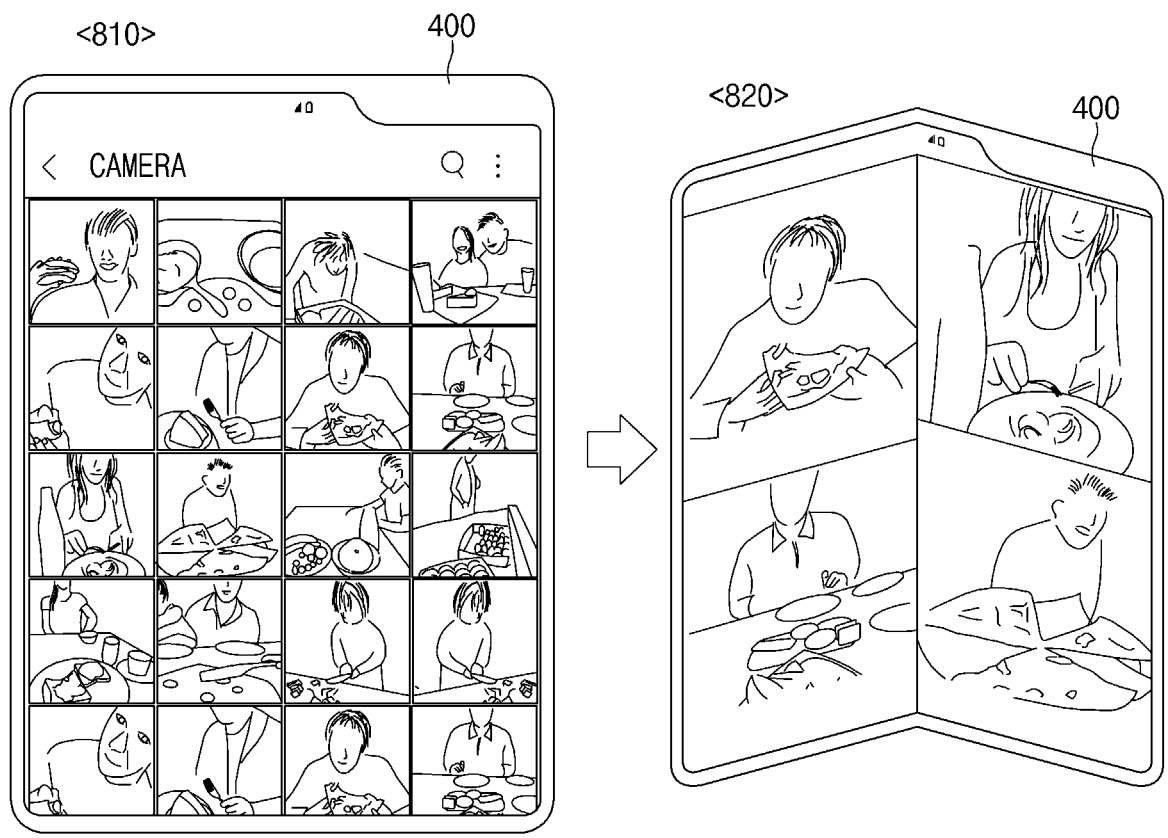
FIG. 8 illustrates a UI screen for displaying an image stored in a gallery in units of two pages according to an embodiment.

FIG. 8 illustrates a UI screen for displaying an image stored in a gallery in units of two pages according to an embodiment.

Referring to FIG. 8, as in a screen 810, in the flat state of the electronic device 400 (e.g., the electronic device 400 of FIG. 4), the electronic device 400 may display thumbnails of images (e.g., photos and videos) stored in the gallery by a first specified number (e.g., 20) per page (normal mode).

As in a screen 820, if it is detected that the electronic device 400 is folded at a specified angle while displaying the thumbnails of images stored in the gallery, the electronic device 400 may display the images in units of two pages by a second specified number (e.g., 2) per page (multiple-column mode). For example, if switching to the multiple-column mode is performed while an image stored in the gallery is being displayed, the electronic device 400 may display the image in an album format instead of the thumbnail of the image. In this case, the electronic device 400 may adjust at least one of the number, size, and ratio of images to be displayed on one page of the two pages depending on whether the images are vertical images or horizontal images and display the adjusted images.

Figure 9:
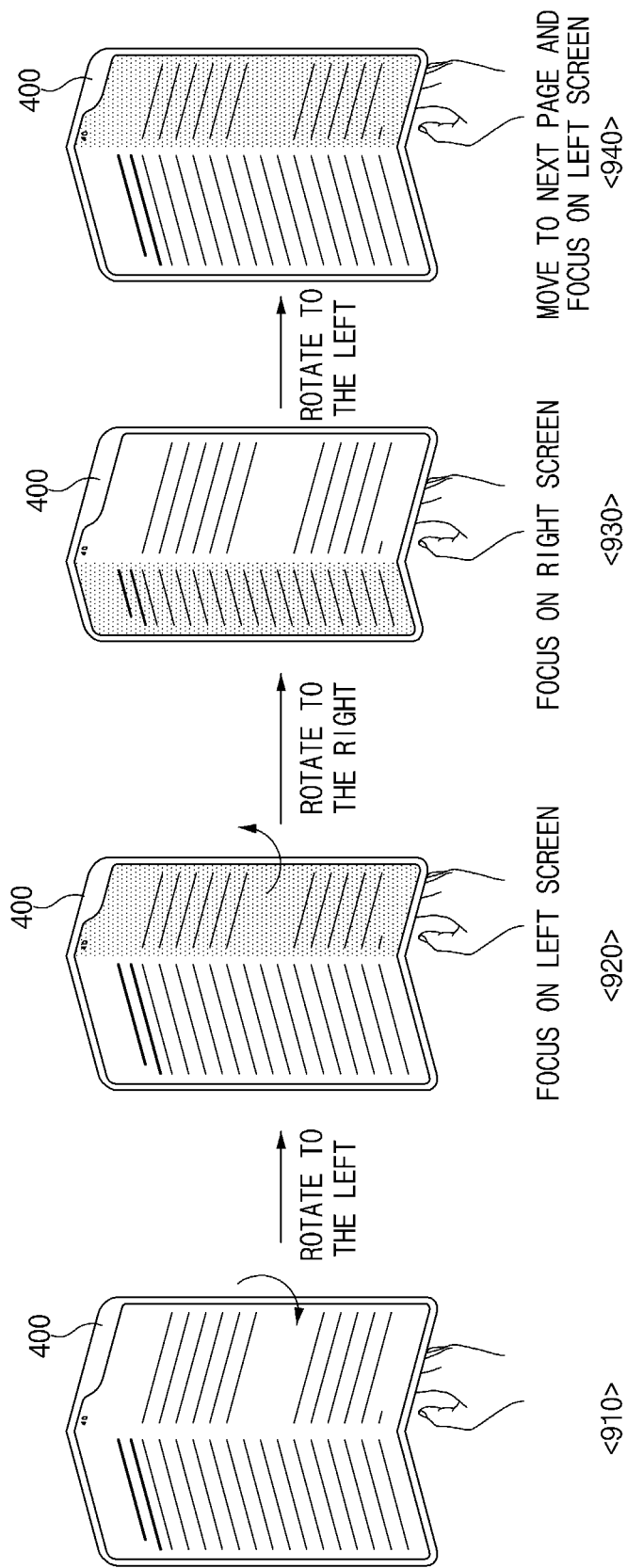
FIG. 9 illustrates a method for adjusting the luminance of a page in a one-hand operation mode according to an embodiment.

FIG. 9 illustrates a method for adjusting the luminance of a page in a one-hand operation mode according to an embodiment.

Referring to FIG. 9, in operation 910, the electronic device 400 (e.g., the electronic device 400 of FIG. 4) may display the first page and the second page with the first luminance if switching to the one-hand operation mode is performed. The electronic device 400 may recognize the rotation angle of the electronic device 400 by using the third sensor circuit 415 in the one-hand operation mode.

If it is detected in operation 910 that the electronic device 400 remains for the third specified time in the state in which it rotates to the left with the folding axis A, based on the recognized rotation angle, in operation 920, the electronic device 400 may display a left page of the two pages with the first luminance and a right page thereof with the second luminance (less than the first luminance).

If it is detected in operation 920 that the electronic device 400 remains for the third specified time in the state in which it rotates to the right with respect to the folding axis, based on the rotation angle of the electronic device 400, in operation 930, the electronic device 400 may display the right page of the two pages with the first luminance and the left page with the second luminance.

If it is detected in operation 930 that, in the state in which the right page is displayed with the first luminance, the electronic device 400 remains for the third specified time in the state in which it rotates to the left with respect to the folding axis A, based on the rotation angle of the electronic device 400, in operation 940, the electronic device 400 may display next two pages of the two pages displayed on the display 430, display a left page of the next two pages with the first luminance and a right page thereof with the second luminance.

Figure 10:
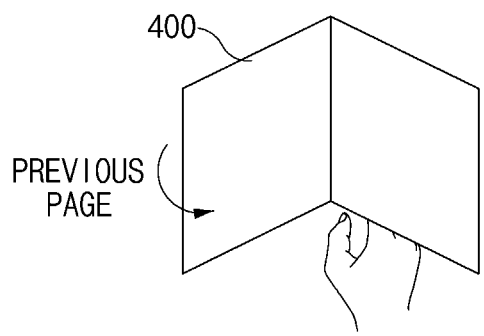
FIG. 10 illustrates a method for switching pages in a one-hand operation mode according to an embodiment.
Figure 10:
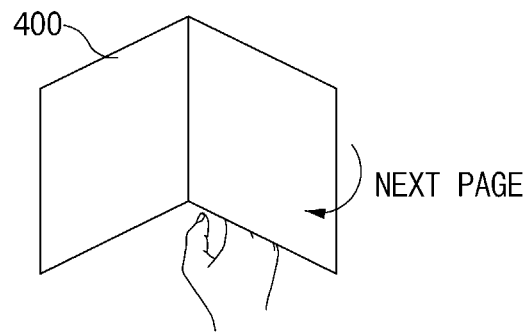

FIG. 10 illustrates a method for switching pages in a one-hand operation mode according to an embodiment.

Referring to FIG. 10, in operation 1010, the electronic device 400 (e.g., the electronic device 400 of FIG. 4) may detect the rotation angle of the electronic device 400 by using the third sensor circuit 415 in the one-hand operation mode. The electronic device 400 may recognize, based on the recognized rotation angle, that the right-left direction of the electronic device 400 is rotated to the right of the electronic device 400 within a second specified time and then restored. If it is recognized that the right-left direction of the electronic device 400 is rotated to the right of the electronic device 400 within a second specified time and then restored, the electronic device 400 may display previous two pages of the two pages displayed on the display 430.

In operation 1020, if it is recognized, based on the recognized rotation angle, that the electronic device 400 is rotated to the left within the second specified time and then restored, the electronic device 400 may display previous two pages of the two pages displayed on the display 430.

Figure 11:
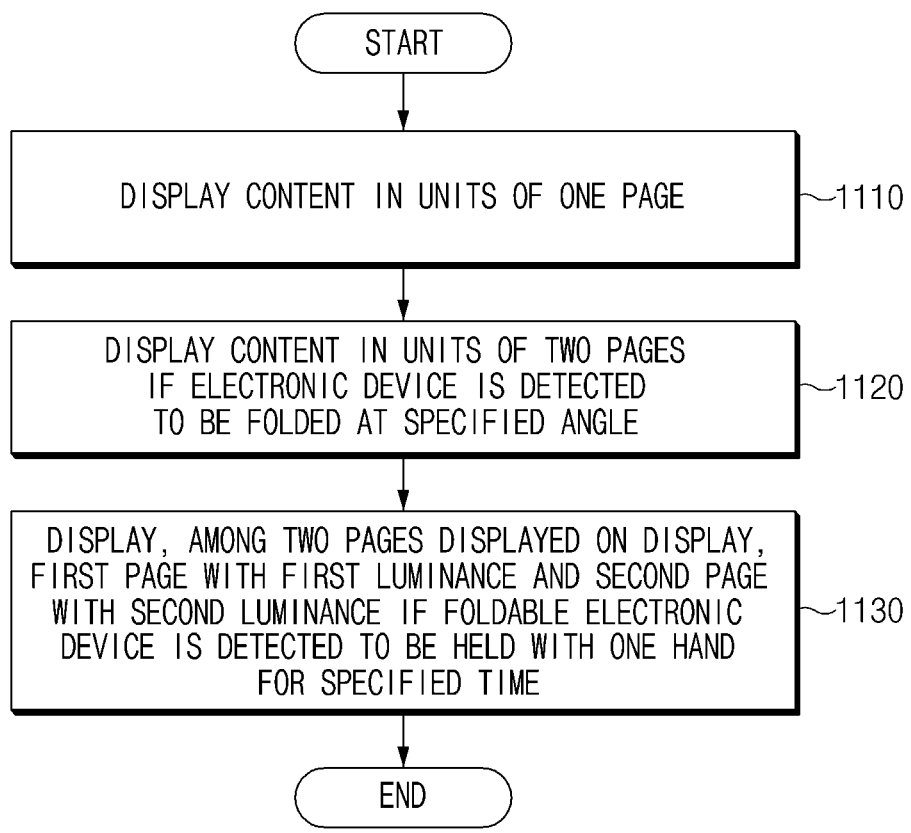
FIG. 11 shows a flowchart of a multiple column display method for content according to an embodiment.

FIG. 11 shows a flowchart of a multiple column display method for content according to an embodiment.

Referring to FIG. 11, in operation 1110, the electronic device 400 (e.g., the electronic device 400 of FIG. 4) may display the content in units of one page. The content may include, for example, content displayed through a designated app such as an E-book app, a web browser, a note app, and a gallery app.

In operation 1120, if it is recognized that the electronic device 400 is folded at a specified angle by using the first sensor circuit 411 (e.g., the first sensor circuit 411 in FIG. 4), the electronic device 400 may display content in units of two pages. For example, the electronic device 400 may detect the magnetic field strength of the magnet (e.g., the magnet 322 of FIG. 3) which is made faced with the first sensor circuit 411 in the folded state of the electronic device 400 by using the first sensor circuit 411 (e.g., the Hall sensor), and recognize that the electronic device 400 is folded at a specified angle if the detected magnetic field strength falls within a specified range. The specified range may be determined through an experiment for measuring the magnetic field strength in a state in which the electronic device 400 is folded at a specified angle.

In operation 1130, if it is recognized that the electronic device 400 is held with one hand for a specified time by using the second sensor circuit 413 (e.g., the second sensor circuit 413 of FIG. 4), the electronic device 400 may display, among two pages displayed on the display 430, the first page with the first luminance, and the second page with the second luminance. For example, the electronic device 400 may recognize contact information including at least one of the contact position of the user, the contact area, or the shape of the contact portion with respect to the first surface (e.g., the back surface) of the electronic device 400, by using the second sensor circuit 413, and may recognize whether the electronic device 400 is held by the user based on the recognized contact information. For another example, if a touch of a specified area or more for a specified position of the electronic device 400 is detected by using the second sensor circuit 413, the electronic device 400 may determine that the electronic device 400 is held by the user.

According to the above-described embodiment, the electronic device 400 lowers the luminance of a page not being read by the user (a page displayed with a second luminance) in a multiple-column mode in which content is displayed in units of two pages, thereby making it possible to reduce power consumption of the display 430.

According to an embodiment, a multiple column display method for content by a foldable electronic device (e.g., the electronic device 400 of FIG. 4) may include displaying content in units of one page through a display (e.g., the display 430 of FIG. 4), displaying the content in units of two pages if it is detected that the foldable electronic device is folded at a specified angle by using a first sensor circuit (e.g., the first sensor circuit 411 of FIG. 4), and displaying, among the two pages displayed on the display, a first page with a first luminance and a second page with a second luminance, if it is detected that the foldable electronic device is held with one hand for a specified time by using a second sensor circuit (e.g., the second sensor circuit 413 of FIG. 4).

The second luminance may be lower than the first luminance.

The multiple column display method may further include recognizing a rotation angle of the foldable electronic device by using a third sensor circuit (e.g., the third sensor circuit 415 of FIG. 4), and displaying the first page with the second luminance and the second page with the first luminance based on the detected rotation angle.

The multiple column display method may further include displaying previous two pages or next two pages of the two pages based on change in the rotation angle.

The displaying in units of two pages may include recognizing whether a folding axis of the foldable electronic device is oriented horizontally or vertically by using the third sensor circuit, arranging the two pages in a right-left direction of the foldable electronic device if the folding axis is oriented vertically, and arranging the two pages in an up-down direction of the foldable electronic device if the folding axis is oriented horizontally.

The displaying of the second page with the second luminance may include recognizing a gaze direction of a user by using a camera, and determining the first page and the second page among the two pages based on the recognized gaze direction.

The multiple column display method may further include determining a function corresponding to a touch detected through the touchscreen display after detecting that the foldable electronic device is folded at the specified angle differently before detecting that the foldable electronic device is folded at the specified angle.

The multiple column display method may further include enlarging at least a portion of the first page without enlarging the second page to display the enlarged portion, in response to a first touch operation on the first page.

The multiple column display method may further include displaying the first page and the second page with the first luminance if it is recognized that the holding of the foldable electronic device is released by using the second sensor circuit.

Figure 12:
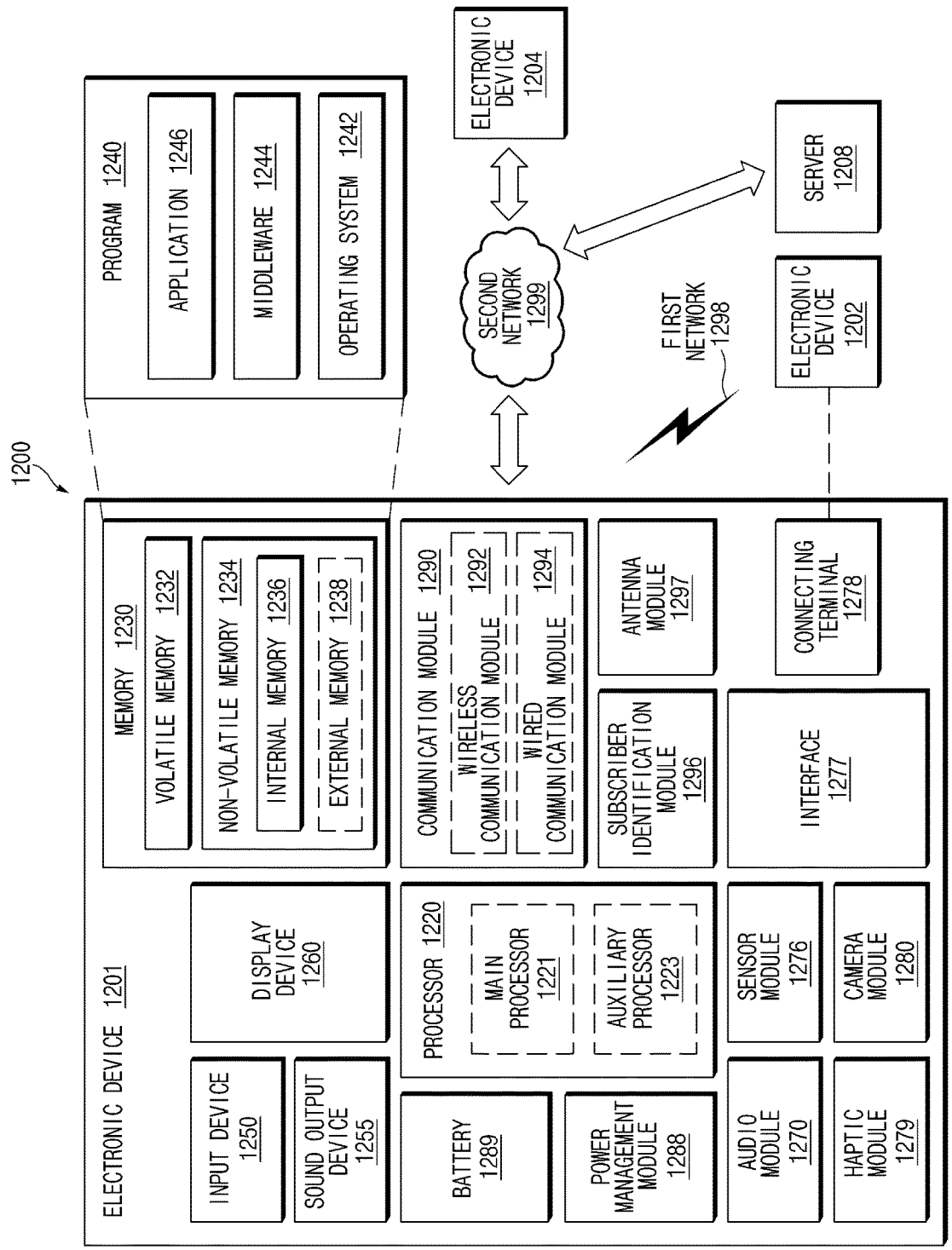
FIG. 12 is a block diagram illustrating an electronic device in a network environment according to various embodiments.

FIG. 12 is a block diagram illustrating an electronic device 1201 in a network environment 1200 according to various embodiments. Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 1201. In some embodiments, some of the components may be implemented as single integrated circuitry. For example, the sensor module 1276 (e.g., a fingerprint sensor, an iris sensor, or an illuminance sensor) may be implemented as embedded in the display device 1260 (e.g., a display).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may load a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, a keyboard, or a digital pen (e.g., a stylus pen).

The sound output device 1255 may output sound signals to the outside of the electronic device 1201. The sound output device 1255 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to an embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to an embodiment, the audio module 1270 may obtain the sound via the input device 1250, or output the sound via the sound output device 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., PCB). According to an embodiment, the antenna module 1297 may include a plurality of antennas. In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:
1. A foldable electronic device comprising:
a foldable display;
a first sensor circuit configured to detect that the foldable electronic device is folded;

a second sensor circuit configured to detect holding of the foldable electronic device by a user;

a processor electrically connected to the display, the first sensor circuit, and the second sensor circuit; and a memory electrically connected to the processor, wherein the memory stores instructions that, when executed, cause the processor to:

display content in units of one page through the display if it is detected that the foldable electronic device is unfolded to exceed a specified angle by using the first sensor circuit;

display the content, which has been displayed in units of one page, in units of two pages through the display if it is detected that the foldable electronic device is folded at the specified angle by using the first sensor circuit while displaying the content in units of one page; and if it is detected that the foldable electronic device is held with one hand for a specified time by using the second sensor circuit while the content, which has been displayed in units of two pages, is displayed with a first luminance, display, among the two pages displayed through the display, a first page with the first luminance and a second page with a second luminance.

2. The foldable electronic device of claim 1, wherein the second luminance is lower than the first luminance.

3. The foldable electronic device of claim 1, further comprising a third sensor circuit configured to detect a rotation angle of the foldable electronic device, wherein the instructions cause the processor to display the first page with the second luminance and the second page with the first luminance based on the rotation angle of the foldable electronic device by using the third sensor circuit.

4. The foldable electronic device of claim 3, wherein the instructions cause the processor to display previous two pages or next two pages of the two pages based on change in the rotation angle.

5. The foldable electronic device of claim 3, wherein the instructions cause the processor to:

recognize whether a folding axis of the foldable electronic device is oriented horizontally or vertically by using the third sensor circuit;

arrange the two pages in a right-left direction of the foldable electronic device if the folding axis is oriented vertically; and arrange the two pages in an up-down direction of the foldable electronic device if the folding axis is oriented horizontally.

6. The foldable electronic device of claim 1, further comprising a camera, wherein the instructions cause the processor to:

recognize a gaze direction of a user by using the camera; and display a page facing the gaze direction among the two pages, with the first luminance and display another page among the two pages with the second luminance.

7. The foldable electronic device of claim 1, wherein the foldable display includes a touchscreen display, and the instructions cause the processor to determine a function corresponding to a touch detected through the touchscreen display differently before detecting that the foldable electronic device is folded at the specified angle and after detecting that the foldable electronic device is folded at the specified angle.

8. The foldable electronic device of claim 7, wherein the instructions cause the processor to enlarge at least a portion of the first page without enlarging the second page to display the enlarged portion, in response to a first touch operation on the first page, if it is detected that the foldable electronic device is folded at the specified angle.

9. The foldable electronic device of claim 1, wherein the second sensor circuit includes at least one of a touch sensor coupled to the display or a proximity sensor or a pressure sensor disposed on a first surface of the foldable electronic device.

10. The foldable electronic device of claim 1, wherein the instructions cause the processor to display the first page and the second page with the first luminance if it is recognized that the holding of the foldable electronic device is released by using the second sensor circuit.

11. A multiple column display method for content in by a foldable electronic device, the method comprising:

displaying content in units of one page through a display if it is detected that the foldable electronic device is unfolded to exceed a specified angle by using a first sensor circuit;

displaying the content, which has been displayed in units of one page, in units of two pages if it is detected that the foldable electronic device is folded at the specified angle by using the first sensor circuit while displaying the content in units of one page; and if it is detected that the foldable electronic device is held with one hand for a specified time by using a second sensor circuit while the content, which has been displayed in units of two pages, is displayed with a first luminance, displaying, among the two pages displayed on the display, a first page with the first luminance and a second page with a second luminance, if it is detected that the foldable electronic device is held with one hand for a specified time by using the second sensor circuit.

12. The method of claim 11, wherein the second luminance is lower than the first luminance.

13. The method of claim 11, further comprising:

recognizing a rotation angle of the foldable electronic device by using a third sensor circuit; and displaying the first page with the second luminance and the second page with the first luminance based on the rotation angle.

14. The method of claim 13, further comprising displaying previous two pages or next two pages of the two pages based on change in the rotation angle.

\* \* \* \* \*